United States Patent
Waterman (10) Patent No.: US 12,498,911 B2
(45) Date of Patent: Dec. 16, 2025

(54) UPDATED DRIVER INSTALLATION

(71) Applicant: NCR Voyix Corporation, Atlanta, GA (US)

(72) Inventor: Simon Waterman, Somerset (GB)

(73) Assignee: NCR Voyix Corporation, Atlanta, GA (US)

(*) Notice: Subject to any disclaimer, the term of this patent is extended or adjusted under 35 U.S.C. 154(b) by 111 days.

(21) Appl. No.: 17/949,577

(22) Filed: Sep. 21, 2022

(65) Prior Publication Data

US 2024/0095002 A1    Mar. 21, 2024

(51) Int. Cl.
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
CPC .................. G06F 8/61; G06F 8/65; G06F 8/60
See application file for complete search history.

(56) References Cited

U.S. PATENT DOCUMENTS

| | | | |
|---|---|---|---|
| 10,180,846 B2 | 1/2019 | Bohdan | |
| 11,700,274 B1 * | 7/2023 | Kravtsov | H04L 63/205 726/25 |
| 11,900,119 B2 * | 2/2024 | Rao Krishnagi | G06F 9/455 |
| 2009/0228881 A1 * | 9/2009 | Mukker | G06F 8/41 717/176 |
| 2010/0070961 A1 * | 3/2010 | Auer | G06F 8/65 717/168 |
| 2013/0019234 A1 * | 1/2013 | Pardehpoosh | G06F 21/128 717/170 |
| 2018/0246715 A1 | 8/2018 | Regmi et al. | |
| 2018/0248770 A1 * | 8/2018 | Regmi | G06F 9/45533 |
| 2019/0171436 A1 | 6/2019 | Shivanna et al. | |
| 2022/0269495 A1 * | 8/2022 | Guan | H04L 67/10 |

FOREIGN PATENT DOCUMENTS

| | | | |
|---|---|---|---|
| JP | 2019-537812 A | 12/2019 | |
| WO | 2018078495 A1 | 5/2018 | |
| WO | WO-2022183573 A1 * | 9/2022 | G06F 8/41 |

OTHER PUBLICATIONS

Shan J; translated WO 2022183573; 23 pages (Year: 2022).*
Xin Lin et al.; A Measurement Study on Linux Container Security: Attacks and Countermeasures; ACM; pp. 418-429; retrieved on Aug. 18, 2025 (Year: 2018).*
JP Office Action—Dec. 15, 2023.
JP Office Action—Dec. 15, 2023—machine translation.
Jun. 10, 2025 Examination Report in corresponding European Patent Appl. No. 22202425.9.

* cited by examiner

*Primary Examiner* — S. Sough
*Assistant Examiner* — Cuong V Luu
(74) *Attorney, Agent, or Firm* — Notaro, Michalos & Zaccaria P.C.; John S. Economou (57) ABSTRACT

At least one software container element contains executable software that is executable on one or more processors of a computing device and which receives, from a kernel of the computing device, first data that is indicative of at least one active driver installed on the kernel, compares the first data with second data that is indicative of at least one predetermined target driver that should be installed on the kernel, and responsive to the comparing, determines if at least one of the predetermined target drivers is not installed on the kernel.

17 Claims, 7 Drawing Sheets

UPDATED DRIVER INSTALLATION

FIELD

The present invention relates to a method and computing device for determining if certain predetermined target drivers need to be installed on a kernel of a computing device. In particular, but not exclusively, the present invention relates to a methodology whereby files are mounted into a software container that is executed on a self-service terminal or point of sale terminal, and the software container is then responsible for determining whether a set of predetermined target drivers is installed on the kernel. If it is determined that they are not installed, the software container is configured to build and install the target drivers on the kernel.

BACKGROUND

It is known that self-service terminals (SSTs) and/or Point of Sale (POS) terminals are used from time to time in the retail industry. SSTs and POS terminals are typically used to enable a customer to conduct transactions with a retail establishment. Each SST or POS terminal in any retail establishment may be connected to different peripheral devices. Each SST or POS terminal may also execute different software, such as having different underlying operating systems (Linux, Windows etc.) and different software applications. This is typically dependent upon the retail establishment where the SST or POS terminal is used, and the intended use of the SST or POS terminal in the retail establishment. From time to time, the software executing on the SST or POS terminal may also be upgraded or the connected peripheral devices may change.

Due to the variations that are often present from terminal to terminal, software developers have started making use of software containers that contain the software that needs to be executed on an SST or POS terminal. Software containers isolate the running software thus helping to avoid complex platform dependencies. That is to say that they are able to execute on one or more processors of a terminal independent of the computing environment of that terminal. This is because a software container contains all of the software (application code as well as any software dependencies) it needs to be executable in any computing environment. Additionally, as these containers operate in their own isolated computing environment (except for certain predefined communication pathways with other software/hardware (such as access to specific files, specific ports) outside the software container), this also makes them particularly secure. Software containers are thus an effective way of packaging and distributing software for use on SSTs and POS terminals. When a software or hardware upgrade is performed on a terminal, a new software container can be executed on the terminal that accounts for these upgrades. Also, since the containers can be pre-built, this can help avoid complex builds on every terminal. It is noted that software containers are different to virtual machines in that they do not require a hypervisor to be installed on the computing device. Software containers are also typically more lightweight and run faster than virtual machines. Furthermore, whereas virtual machines virtualize the entire computer system, software containers virtualize the operating system. Software containers also share a single operating system whereas each virtual machine has its own operating system.

When deploying a software container, a container engine (such as docker, RKT, CRI-O, and LXD or the like) is utilized. The container engine can accept user requests or requests from an API server of a container orchestrator (such as Kubernetes, Swarm, Mesos, or the like), pull image files (in a particular image format) from a registry, prepare a container mount point, prepare metadata that is needed to execute a software container and call a container runtime. The container runtime is a part of the container engine. The container runtime (such as runc, containerd, crun, railcar, katacontainers, or the like) uses the mount point and the metadata provided by the container engine and communicates with the kernel (of a host OS) running on the computing device in order to execute a container image file and thereby create a software container.

When implementing multiple containers across multiple computing devices, a software container orchestrator platform is often used. These platforms are able to schedule container workloads across multiple computing devices (e.g., SSTs or POS terminals) and are also able to provide a standardized application definition file (e.g., kube YAML, docker compose, or the like). Kubernetes is an example of a container orchestration platform.

A Kubernetes container orchestration platform is a cluster of units, including a controlling unit called the Kubernetes master, which manages the cluster, and at least one node (or worker) which runs workloads (containers). One part of the Kubernetes orchestrator platform is the kubelet. The kubelet is an agent that runs on every worker which is part of the Kubernetes system. During operation, the kubelet receives commands (from an API server on a Kubernetes master) that informs the kubelet what container(s) should be running on a computing device. In Kubernetes, these containers are provided within 'pods'. Typically a single pod includes a single container although it is possible to include multiple containers within a pod. The kubelet passes information regarding what container(s) should be running on a computing device to a container engine (e.g., via a Container Runtime Interface (CRI)) for execution of a software container via a container runtime within the container engine.

A software container is created when a container runtime executes an executable container image file. As such, a software container is essentially a runtime instance of an associated executable container image file. In this sense, an executable container image file is an image file that has all of the software it needs to at least be executable as a software container element. In more detail, a container image file is typically a binary file that includes all the necessary requirements for running a software container, in addition to any metadata describing needs and capabilities of the software container. The container image file itself is made up of several layers that define the executable instructions needed for running the software container. For example, a container image file may include several layer(s) which define a software application(s) executable code, several layers(s) defining code for any software dependencies upon which the software application(s) rely, and several layer(s) defining code for any required configuration settings. Container image files are often stored in a container image registry. Each container image file is stored in a particular container image format that defines the layers and metadata within a container image file. For example, the Open Container Initiative (OCI) image format defines the image file as tar files for each layer and a manifest file in JSON format which specifies the metadata associated with the image file.

The drivers that are installed on a kernel of an SST or POS terminal may need to be updated from time to time. One way of doing this is via manual intervention by an engineer who locally or remotely accesses the terminal to update the kernel drivers. Another way this may be achieved is by running a software container on the SST or POS terminal which has privileged access, which means that the container has most of or all root capabilities of the underlying host computing device, thus allowing access to resources (such as updating the kernel) which would not be available in non-privileged containers. However, providing software containers with privileged access is thus a security risk and against deployment best practices. This is particularly concerning in retail given the need for SSTs and POS terminals to have robust security.

Known approaches use some automation system such as Ansible to automatically install a set of drivers onto the bare-metal of the underlying host computer. There are a few problems with all of these approaches:
1. Security—someone or some process needs privileged access to the host computer at the bare-metal level.
2. Pre-building drivers—you have to know ahead of time what drivers you will need and what kernel versions are installed so you have the right drivers pre-built for the right kernels.
3. The host file-system is typically modified at least to include the new drivers, which is a source of 'configuration drift' resulting in systems that should be the same diverging from each other.
4. The life-cycle and tooling used to manage the distribution of application software is different from the life-cycle and tooling used to manage the distribution of driver software.

SUMMARY

It is an aim of the present invention to at least partly mitigate one or more of the above-mentioned problems.

It is an aim of certain embodiments of the present invention to help provide a software container that can update drivers of a kernel without requiring the software container to have privileged access.

It is an aim of certain embodiments of the present invention to help automatically and securely install up to date kernel drivers.

It is an aim of certain embodiments of the present invention to help provide a software container that enables distribution of the code for kernel drivers and abstraction of the kernel driver build process. In this way, up to date drivers can be transparently installed on a kernel in any computing environment (i.e., regardless of the Operating System), without having to coordinate and build the drivers in advance.

It is an aim of certain embodiments of the present invention to provide a software container that can build target kernel drivers and then provide these to the kernel according to the needs of the kernel.

It is an aim of certain embodiments of the present invention to help provide flexibility to use out of tree kernel drivers in a broad range of operating environments, including varying operating systems and kernel versions, without the need for pre-built binaries.

According to a first aspect of the present invention there is provided a computer-implemented method for determining if at least one predetermined target driver should be installed on a kernel of a computing device, comprising the steps of: by at least one software container element that contains executable software that is executable on one or more processors of a computing device, receiving, from a kernel of the computing device, first data that is indicative of at least one active driver installed on the kernel; comparing the first data with second data that is indicative of at least one predetermined target driver that should be installed on the kernel; and responsive to the comparing, determining if at least one of the predetermined target drivers is not installed on the kernel.

Aptly, the method further comprises responsive to determining that there is at least one selected target driver, of the predetermined target drivers, not installed on the kernel, building at least one of the selected target drivers within the software container element.

Aptly, the method further comprises building the selected target drivers in the software container element using a dynamic kernel make system, DKMS.

Aptly, the method further comprises providing the selected target drivers built within the software container element to the kernel; and installing the selected target drivers built within the software container element on the kernel.

Aptly, the method further comprises providing the executable software within a single software container element as software that at least defines source code associated with each of the predetermined target drivers and code defining how each of the predetermined target drivers is built.

Aptly, the method further comprises providing the executable software within a single software container element as software that at least defines:
source code associated with each of the predetermined target drivers;
a framework for a Dynamic Kernel Make System, DKMS;
a configuration for the DKMS; and
at least one build tool usable by DKMS to build the predetermined target drivers.

Aptly, the method further comprises providing executable software in each respective software container element as software that at least defines source code associated with a respective predetermined target driver of the predetermined target drivers and code defining how the respective predetermined target driver is built.

Aptly, the method further comprises receiving the first data as data indicative of each active driver installed on the kernel.

Aptly, the method further comprises receiving the first data as data indicative of a driver type and driver version of the at least one active driver installed on the kernel.

Aptly, the method further comprises receiving, at the software container element, one or more kernel header files.

Aptly, the method further comprises mounting the kernel header files read-only into the software container element.

Aptly, comparing the first data with the second data comprises querying one or more files received from the kernel to determine a type and version of each active driver installed on the kernel.

Aptly, comparing the first data with the second data further comprises querying the executable software to determine a type and version of said at least one predetermined target driver.

Aptly, the method further comprises responsive to the comparing, determining at least one selected target driver, of the predetermined target drivers, that is not present on the kernel or that has an out-of-date version installed on the kernel.

Aptly, the method further comprises providing the software container element as a software container element of an INIT type.

Aptly, the method further comprises providing the executable software as software that is executable independent of computing environment.

Aptly, the method further comprises via the software container element, executing the executable software in an isolated computing environment.

According to a second aspect of the present invention there is provided a computing device comprising one or more processors configured to execute executable software contained within a software container element, wherein the software, when executed, is configured to: receive, from a kernel of a computing device, first data that is indicative of at least one active driver installed on the kernel; compare the first data with second data that is indicative of at least one predetermined target driver that should be installed on the kernel; and determine whether at least one of the predetermined target drivers is not installed on the kernel.

Aptly, the computing device is a point of sale terminal or self-service terminal.

According to a third aspect of the present invention there is provided a computer program comprising instructions which, when executed by a computing device, cause the computing device to carry out the steps of the method defined by the first aspect of the present invention.

Certain embodiments of the present invention help provide a Dynamic Kernel Make System within a software container, such that the container can configure the kernel of the host computing device with the necessary drivers.

Certain embodiments of the present invention help provide kernel driver build software within a software container which thus enables the build software to be packaged and distributed to any computing environment.

Certain embodiments of the present invention help provide a methodology for installing up to date kernel drivers without having to pre-build kernel drivers in advance for a wide range of operating systems and kernel versions running on SSTs or POS terminals. This methodology thus helps provide flexibility in what OS and kernel version is installed on any SST or POS terminal.

Certain embodiments of the present invention help provide a computing device which executes a software container that ensures the kernel drivers present on the computing device are correct and up to date, before executing other software containers on the computing device.

Certain embodiments of the present invention help provide a software container of an INIT type for building kernel drivers.

Certain embodiments of the present invention help provide a methodology for determining whether any predetermined target drivers that should be installed on a kernel are not installed on the kernel.

Certain embodiments of the present invention help provide a methodology for determining whether any drivers need to be installed on a kernel, dynamically building the drivers that do need to be installed on the kernel, and providing these built drivers to the kernel for installation.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
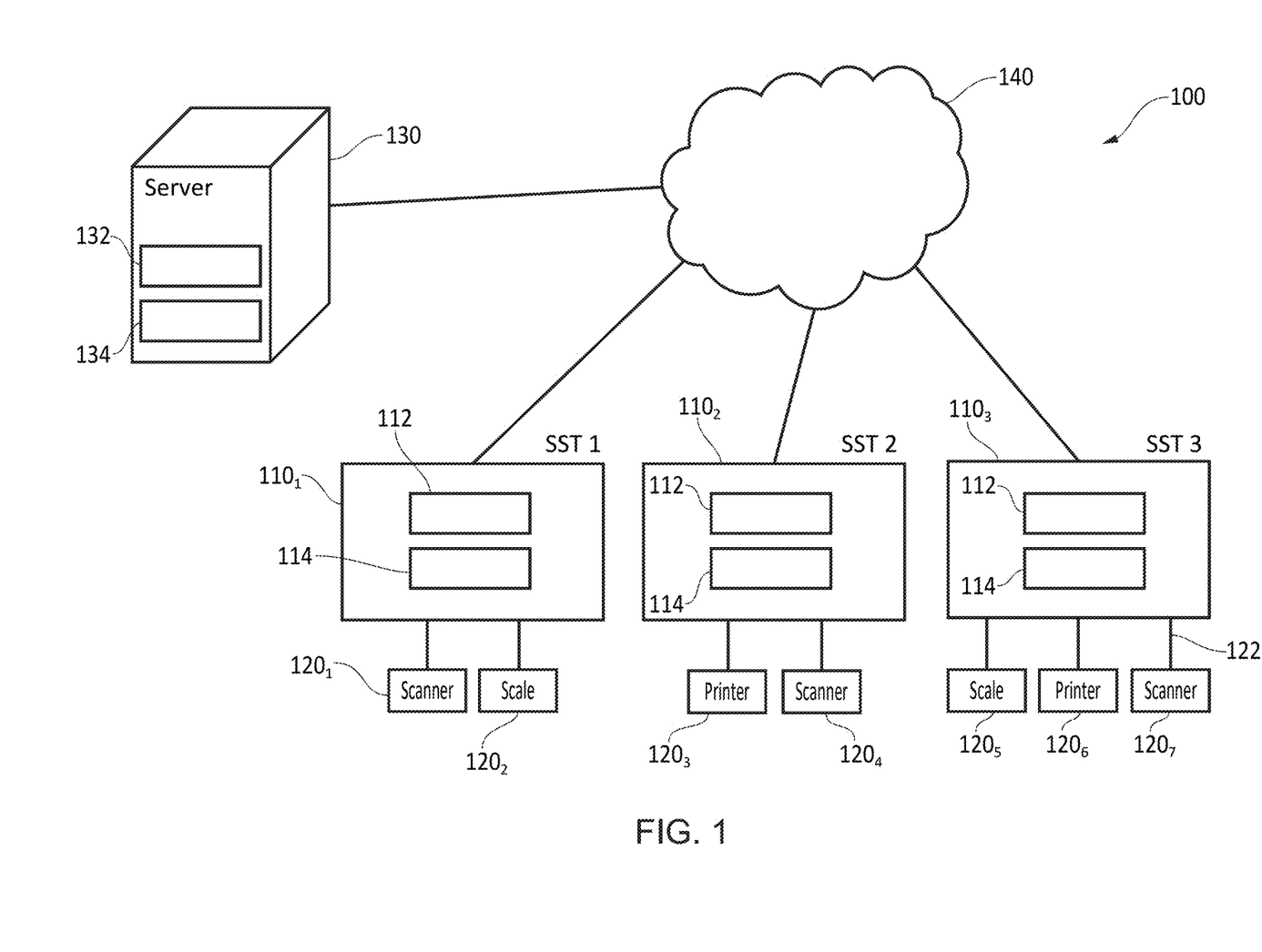
FIG. 1 illustrates a computing system.

FIG. 1 illustrates a computing system 100. In the computing system 100 there are three self-service terminals (SSTs) 1101, 1102, 1103. The SSTs are an example of a computing device. In certain other embodiments of the present invention, the computing device may be a Point of Sale (POS) terminal, an Automated Teller Machine (ATM), a personal computer, a laptop, a tablet or the like. Each SST includes one or more processors 112 and at least one memory 114. The memory is a non-transitory computer-readable storage medium. The memory 114 stores executable software that is executable by the processors 112 of the SST. Each SST may also include a communication interface (not shown) for communicating with a server and one or more communication interfaces (not shown) for communicating with connected peripheral devices. In the system illustrated in FIG. 1, a scanner peripheral device 1201₁ and a scale peripheral device 1202 is connected to the first SST 110₁. Also, a printer peripheral device 1203 and a scanner peripheral device 1204 is connected to the second SST 110₂. Also, a scale peripheral device 1205, printer peripheral device 1206 and scanner peripheral device 1207 are connected to the third SST 110₁₃. It will be appreciated in certain other embodiments of the present invention each SST may be connected to different combinations of peripheral device. Each peripheral device may communicate with the SST it is connected to via a wired interface 122. It will be appreciated that in certain other embodiments of the present invention the interface may be wireless or a combination of wired and wireless. Each SST communicates with a server 130 via a network 140. The server is also an example of a computing device. The network 140 may be wired, wireless or a combination of wired and wireless. The server 130 also includes one or more processors 132 and at least one memory 134. The memory 134 is also a non-transitory computer readable storage medium. The memory 134 stores executable software that is executable by the processors of the server. The executable software of the SSTs and the server will be described in more detail below.

Figure 2:
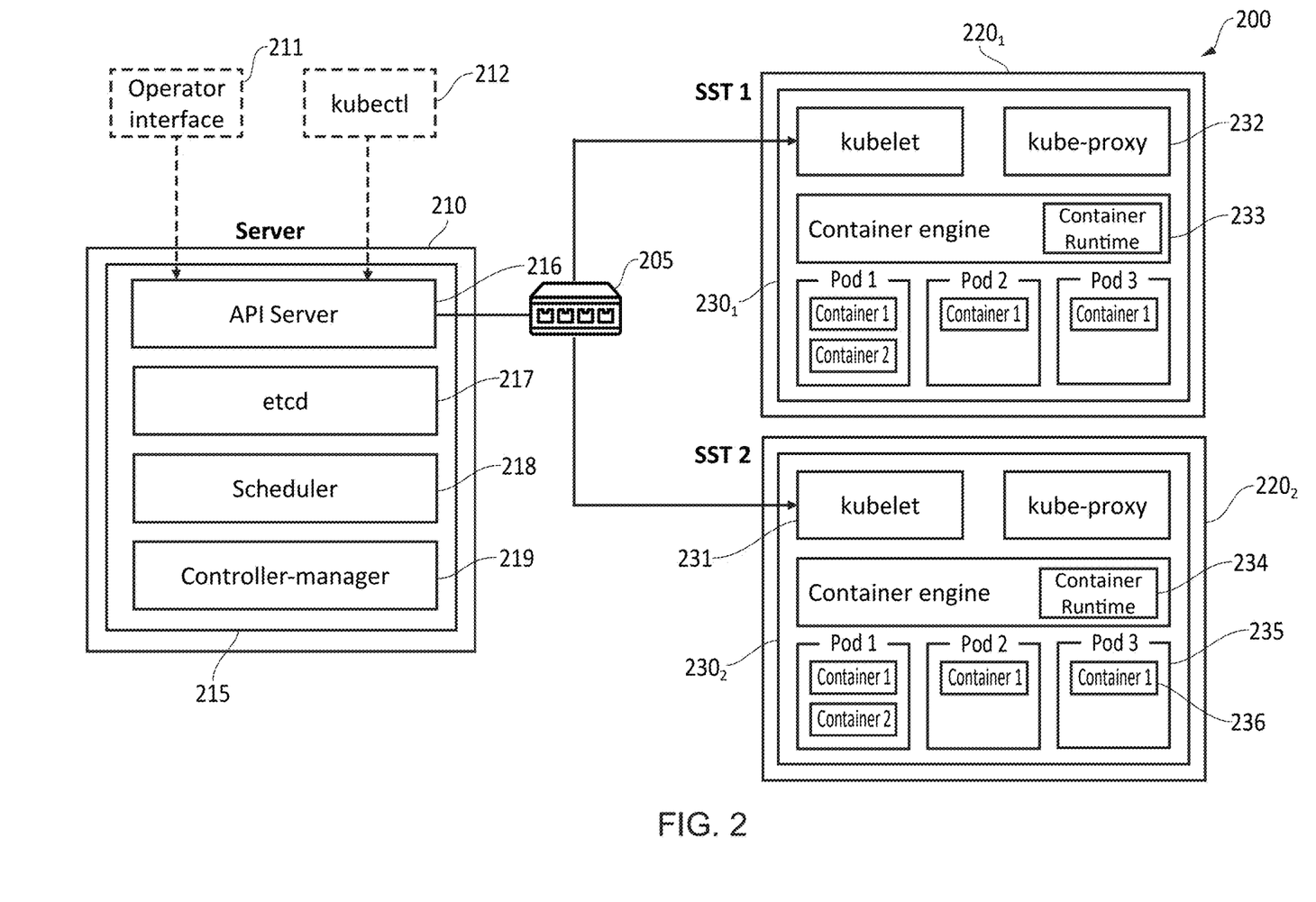
FIG. 2 illustrates a computing system under the control of a Kubernetes orchestration platform.

FIG. 2 illustrates a computing system 200. The computing system has several components under the control of a Kubernetes container orchestration platform. As such, the system may be referred to as a Kubernetes cluster. The Kubernetes cluster includes a server 210, on which a Kubernetes master 215 runs, and self-service terminals (SSTs) 220₁, 220₂, on which respective Kubernetes workers 230₁, 230₁₂ run. It will be appreciated that the server 210 may be a physical server or a cloud server. The server 210 and the SSTs communicate over a network 205 such as a local area network or the internet. The network may be wired and/or wireless. It will be appreciated that devices other than SSTs may be connected to the network and run a Kubernetes worker.

The Kubernetes master 215 which runs on the server 210 includes an API server 216 that manages the Kubernetes cluster. The API server 216 issues commands based on information it receives from other internal components of the master 215 and interfaces with external components such as kubectl 212 and kubelets (such as kubelet 231 on SST2 2202) which are running on Kubernetes workers 2301, 2302. Etcd 217 is a distributed database for the Kubernetes cluster which stores information such as the configuration of the cluster. Etcd 217 also stores the desired state of the Kubernetes workers 2301, 230¬2 and the actual state of the Kubernetes workers 2301¬, 230¬2. A state may be understood as being an indication of the pods (such as Pod 3 235 on SST2 2202) and their containers (such as container 236 in Pod 235) that are running on each Kubernetes worker 2301, 230¬2 in the cluster. A scheduler 218 monitors when new pods are to be run on a Kubernetes worker and then decides which Kubernetes worker to deploy them on. A controller-manager 219 runs controller processes which attempt to move the actual state of the Kubernetes workers 2301, 230¬2 closer to the desired state specified on etcd 217. The master 215 also contains kubectl 212, a command-line tool for communicating with the Kubernetes cluster via the API server 216, and an operator interface 211.

Each Kubernetes worker 2301, 230¬¬2 located within the Kubernetes cluster runs on an SST. According to certain embodiments of the present invention, the worker may run on a virtual machine of the SST. The worker 230 is able to communicate with other workers 230 and the master 215 through the network 205. Each worker 230 has a kubelet that manages the operation of the worker 230. The kubelet (such as kubelet 231 on SST 2202) issues commands to the other components of the worker 2302, monitors the pods running on the worker (such as pod 235) and their containers (such as container 236), and communicates with the API server 216. The kubelet 231 receives deployment files and ensures that the containers 236 described in those deployment files are running and healthy. A kube-proxy (such as kube-proxy 232) is a network proxy which enables pods, in both the same Kubernetes worker and a different worker to communicate. A container engine (such as engine 233) runs and manages containers, receiving commands from the kubelet and container images from a registry. The container engine prepares container metadata which is passed on to a container runtime (such as container runtime 234), that is responsible for the running of the containers within the Kubernetes worker that the runtime is located within.

A pod exists within any Kubernetes worker after the pod is deployed to a Kubernetes worker by the API server 216 of the Kubernetes master 215. The pod commonly includes a single container although the pod may comprise multiple containers with similar functions, which will share storage and network resources. The pod is able to request access to specific resources available to the worker through the kubelet, or to communicate with other pods by using the kube-proxy.

Figure 3:
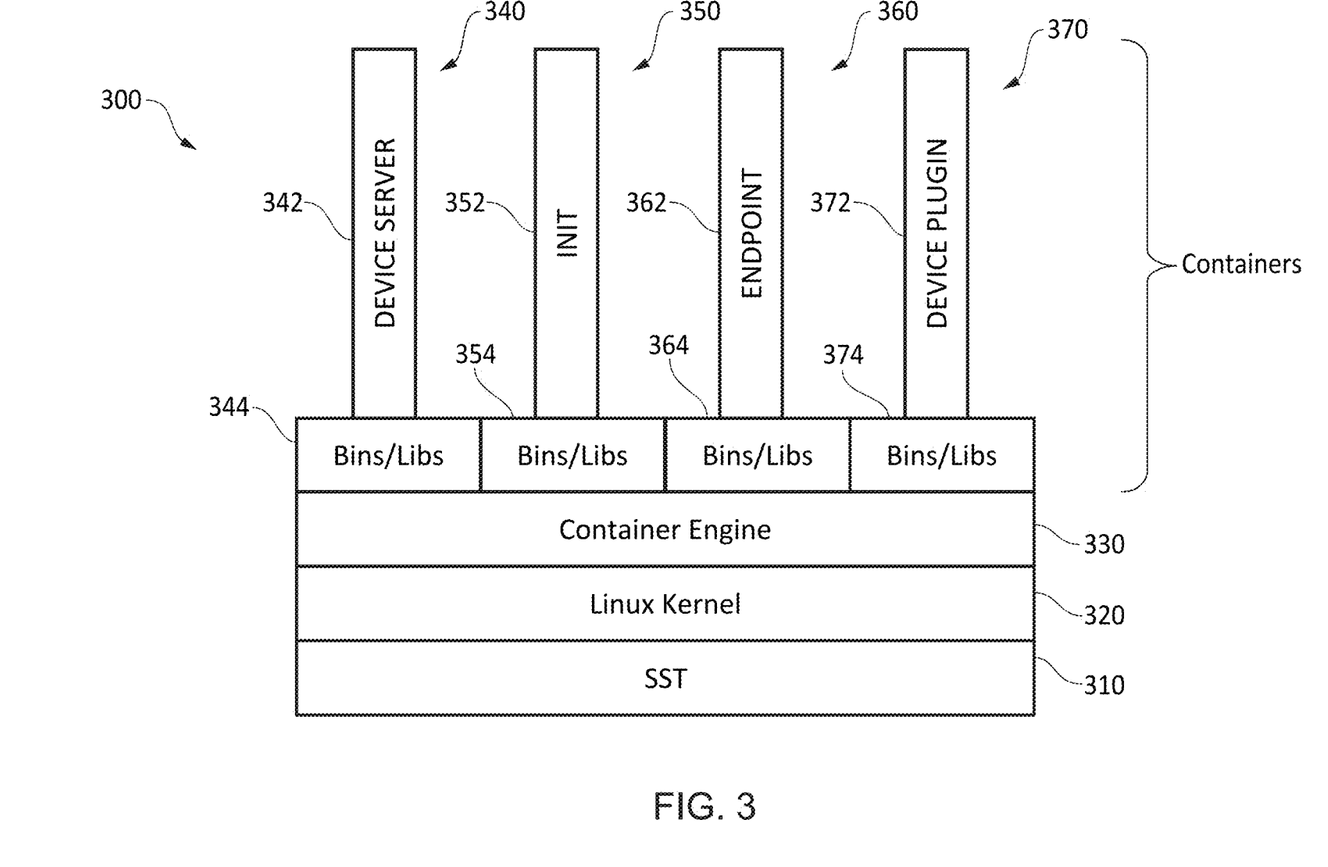
FIG. 3 illustrates a hardware and software architecture for a self-service terminal that executes several software containers.

FIG. 3 illustrates a hardware and software architecture 300 for a self-service terminal that is configured to execute several software container elements. In FIG. 3, the underlying hardware is an SST 310. This may be one of the SSTs described with respect to FIG. 1 or FIG. 2. As described hereinabove, the SST includes one or more processors and at least one memory. The memory stores executable software that is executable by the processors. The executable software includes a Linux kernel 320 which may be part of a Host Operating System (such as Unix, Ubuntu or the like). It will be appreciated that in certain other embodiments of the present invention other kernels and other host operating systems could be utilized (Windows, Mac etc.). Also included as part of the executable software is a container engine 330. The container engine is responsible for accepting user requests or requests from an API server of a container orchestrator (such as Kubernetes, Swarm, Mesos, or the like), pulling image files (in a particular image format) from a registry, preparing a container mount point, preparing metadata that is needed to execute a software container and calling a container runtime. The container runtime (not shown) is a part of the container engine. The container runtime (such as runc, containerd, crun, railcar, katacontainers, or the like) uses the mount point and the metadata provided by the container engine and communicates with the Linux kernel 320 running on the computing device in order to execute several container image files and thereby create several software containers. The executable image files for each of the software containers shown in FIG. 3 may be downloaded from a registry. In FIG. 3, four software container elements are illustrated. A first software container element 340 is referred to as the device server container. The device server container includes application software 342 and associated binaries and libraries 344 (the binaries and libraries may be referred to as software dependencies). The application running in the device server container is responsible for controlling, configuring or otherwise accessing one or more of the peripheral devices connected to the SST at a low level and for exposing business level functions across the network to other components of the SST. For example, the device server may talk via the 'USB' protocol to a scanner (low-level) and report scanned bar-codes (business level) to other components. The software within the device server container is able to access the peripheral device paths and thus use or interact with the peripheral devices. A second software container element 350 is referred to as the INIT container. The INIT container includes application software 352 and associated binaries and libraries 354 (the binaries and libraries may be referred to as software dependencies). The application running in the INIT container is responsible for detecting, building and installing kernel drivers as described herein. It will be appreciated by a person of skill in the art that more than one INIT container may be provided. Each INIT container may build a specific kernel driver. The INIT container initializes in its Pod before the main (non-INIT) containers start. The INIT container is a concept of the Kubernetes system but it will be appreciated that containers which are configured to execute first (i.e., before other containers) may also be utilized in other container orchestration platforms. A third software container element 360 is referred to as the Endpoint container. The Endpoint container includes application software 362 and associated binaries and libraries 364 (the binaries and libraries may be referred to as software dependencies). The application running in the Endpoint container makes information about an SST, such as the motherboard Universally Unique Identifier (UUID), available to the rest of the Kubernetes cluster. A fourth software container element 370 is referred to as the device plugin container. The device plugin container includes application software 372 and associated binaries and libraries 374 (the binaries and libraries may be referred to as software dependencies). The application running in the device plugin container is responsible for advertising what peripheral devices are connected to the SST. As can be seen in FIG. 3, each software container element has its own binaries and libraries (bins/libs). However, it will be appreciated that according to certain other embodiments of the present invention any combination of containers could share bins/libs.

Figure 4:
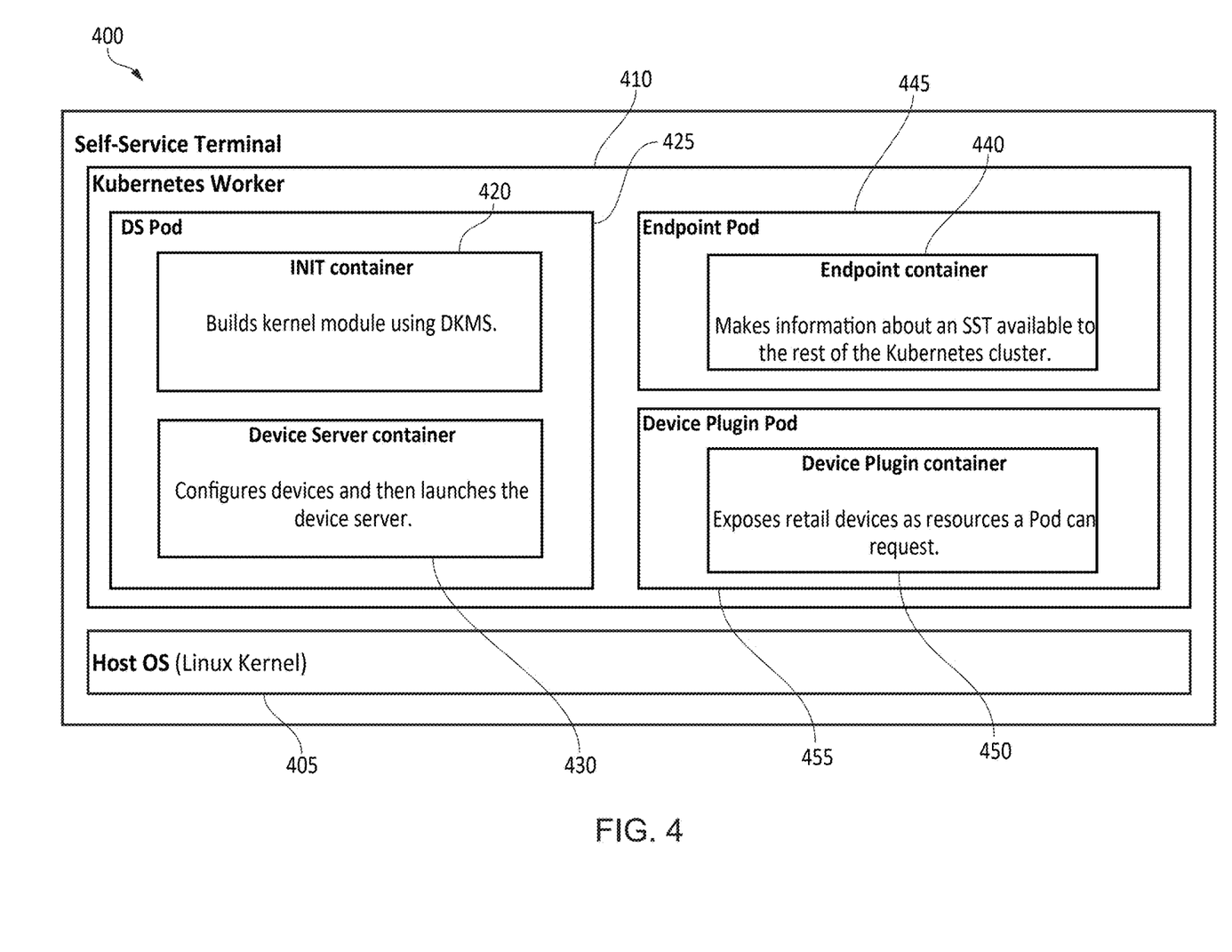
FIG. 4 illustrates software container elements that execute on a self-service terminal.

Turning now to FIG. 4, what is illustrated is a self-service terminal 400 and the software container elements that are configured to be executed on the self-service terminal (that is on one or more processors of the SST). Each of the software containers on the SST contains executable software (defined by an image file). The executable software is executed in the containers in such a way that the software is executed in an isolated computing environment. The software is isolated in the sense that it does not depend on any of the other software containers also executing on the SST to operate. The software effectively executes in its own computing environment and communicates with hardware/software outside this environment through predefined communication pathways. Providing the executable software within software containers means that the software is able to be executed independent of computing environment. In FIG. 4, the containers are managed using the Kubernetes container orchestration platform. The SST shown in FIG. 4 may be the SST described with reference to any of FIGS. 1-3 above. The SST 400 runs a Linux kernel 405 as part of a Host Operating System. Other Operating Systems could of course be used according to certain other embodiments of the present invention. Using the Kubernetes system, the self-service terminal executes software referred to as a Kubernetes worker 410. The Kubernetes worker may also be referred to as a node. A first software container element 420, a second software container element 430, a third software container element 440 and a fourth software container element 450 are included within the Kubernetes worker 410. The Kubernetes platform is responsible for managing these containers as described with reference to FIG. 2. The first, second, third and fourth software containers may be the same containers as described with reference to FIG. 3. The self-service terminal 400 also includes additional software (not shown) that executes external to the Kubernetes worker 410. In the Kubernetes worker 410, the first software container 420 and the second software container 430 are executed within a single pod referred to as a device server pod 425. Because the first software container 420 is of the INIT type, it is the first container executed within the device server pod (i.e., it executes before the device server container). The third software container 440 is executed within a single pod referred to as an Endpoint pod 445. The fourth software container 450 is executed within a single pod referred to as a Device Plugin pod 455. The creation of each of these pods is defined by three different pod specification files (i.e., deployment.YAML files) as will be appreciated by a person of skill in the art. Pods are used in Kubernetes to provide containers with shared storage and network resources, and a specification for how to run the containers within the pods. It will of course be appreciated that in certain other embodiments of the present invention, different container orchestration platforms may be used (e.g., Docker compose, Docker swarm or the like) and these other platforms may not require the use of pods. During operation of the SST 400, each of these pods/containers are executed by a container runtime (not shown) of a container engine (not shown). The image file associated with each of these containers may be downloaded from a registry.

On startup of the SST 400, once the software associated with the operating system and the container engine (not shown) is executed, a kubelet (not shown) running on the SST is provided with deployment files from a Kubernetes master. The deployment files are passed from the kubelet to the container engine in order for certain pods (and their associated software containers) to be executed on the SST. One of these pods is the device server pod which includes the INIT container and the device server container. The image files for each of these containers is downloaded from a container image registry. The INIT container image file includes layers that define executable instructions relating to the source code for each of a set of predetermined target drivers that should be installed on the kernel of the SST. The layers of the INIT container also define executable instructions relating to a Dynamic Kernel Make System (DKMS) framework and configuration. The layers of the INIT container also define executable instructions relating to Linux build tools required by DKMS to build kernel drivers (i.e., the predetermined target drivers). It will be appreciated that the build tools are Linux based as the SST is running a Linux kernel. However, it will be appreciated that according to certain other embodiments of the present invention, the build tools may not need to be Linux-based when other Operating Systems (Windows, Mac or the like) are employed. It will be appreciated that in certain other embodiments of the present invention, instead of providing source code for each of a set of predetermined target drivers within a single INIT container, a separate INIT container may be provided which each includes source code for a respective one predetermined target driver. Each of these separate INIT containers would also each include the DKMS framework and configuration and the Linux build tools. Once the image file for the INIT container is executed, an INIT software container is provided. This software container contains executable software and includes executable instructions defined by the image file as discussed above. It is noted that the INIT container is of a predefined type which means that it is executed before other containers within the same pod. Whilst an INIT container is particular to the Kubernetes platform, it will be appreciated that there are similar mechanisms for executing one container before other containers using other container orchestration platforms. Once the INIT container is executed, it performs certain steps to ensure the kernel has up to date device drivers installed thereon before other containers are executed.

Firstly, on execution of the INIT container, data is sent to the INIT container that indicates what active drivers are installed on the kernel. The data may be received as driver information files from the host OS that are mounted into the container. On Linux the kernel exposes a list of loaded drivers in the file '/proc/modules' and using the command 'lsmod'. The version of the driver can be found using the 'modinfo' command. The driver information files thus can provide an indication of a type and version for each active driver currently installed on the kernel. Once the driver information files have been mounted in the INIT container, the INIT container interrogates the files to determine whether the required driver (and version) is already installed on the kernel. This includes determining whether the kernel version is up to date. This involves querying the files to determine a type and version of each active driver installed on the kernel and querying the executable software within the INIT container to determine the type and version of each predetermined target driver that should be installed on the kernel. The INIT container then compares these two sets of data (from the kernel driver information files and from the INIT container) to determine whether any drivers of the predetermined target drivers should be installed on the kernel. If the comparison of this data leads to the conclusion that all necessary drivers (and versions) are installed on the kernel, then no action is needed and the INIT container ends its execution. The device server container within the device server pod may then be executed. However, if the comparison leads to the conclusion that any of the drivers from the predetermined target drivers is not installed on the kernel or that a version of any of the drivers of the predetermined target drivers is more up-to-date than the respective active drivers installed on the kernel, then the INIT container takes further action.

In particular, the INIT container initiates a build phase where the necessary drivers (some of the predetermined target drivers) are built within the INIT container. This may be achieved using a Dynamic Kernel Make System (DKMS), which has its framework and configuration defined in the executable software of the INIT container. In more detail, DKMS is a framework for dynamically building kernel drivers. It takes the kernel headers of the running kernel, the source code of the target driver, and some build instructions in the form of a configuration file. It then knows how to interpret the configuration file to work out the commands necessary to build the kernel driver and then it executes the commands. The kernel header files can be mounted from the kernel read-only into the INIT container when the container is executed. The role of the kernel headers is to enable the target drivers to be built correctly and to ensure compatibly with the currently running kernel. Once the drivers are built within the INIT container, these built drivers are then provided to the kernel. The kernel receives these drivers and then executes a process to install the drivers on the kernel. This is carried out by loading the executable instructions of the driver into memory and linking them into the running kernel. For Linux, to provide the built drivers from the INIT container to the kernel, the insmod command is used. The INIT container has SYS_MODULE capability so can carry out this command. It will be appreciated that for other operating systems, other commands will be used. In this way, the INIT container does not need to have privileged access to the kernel.

Once the INIT container builds all necessary predetermined target drivers (that need to be installed) and provides these to the kernel for installation, the INIT container ends execution. The device server container within the device server pod may then be executed.

Figure 5:
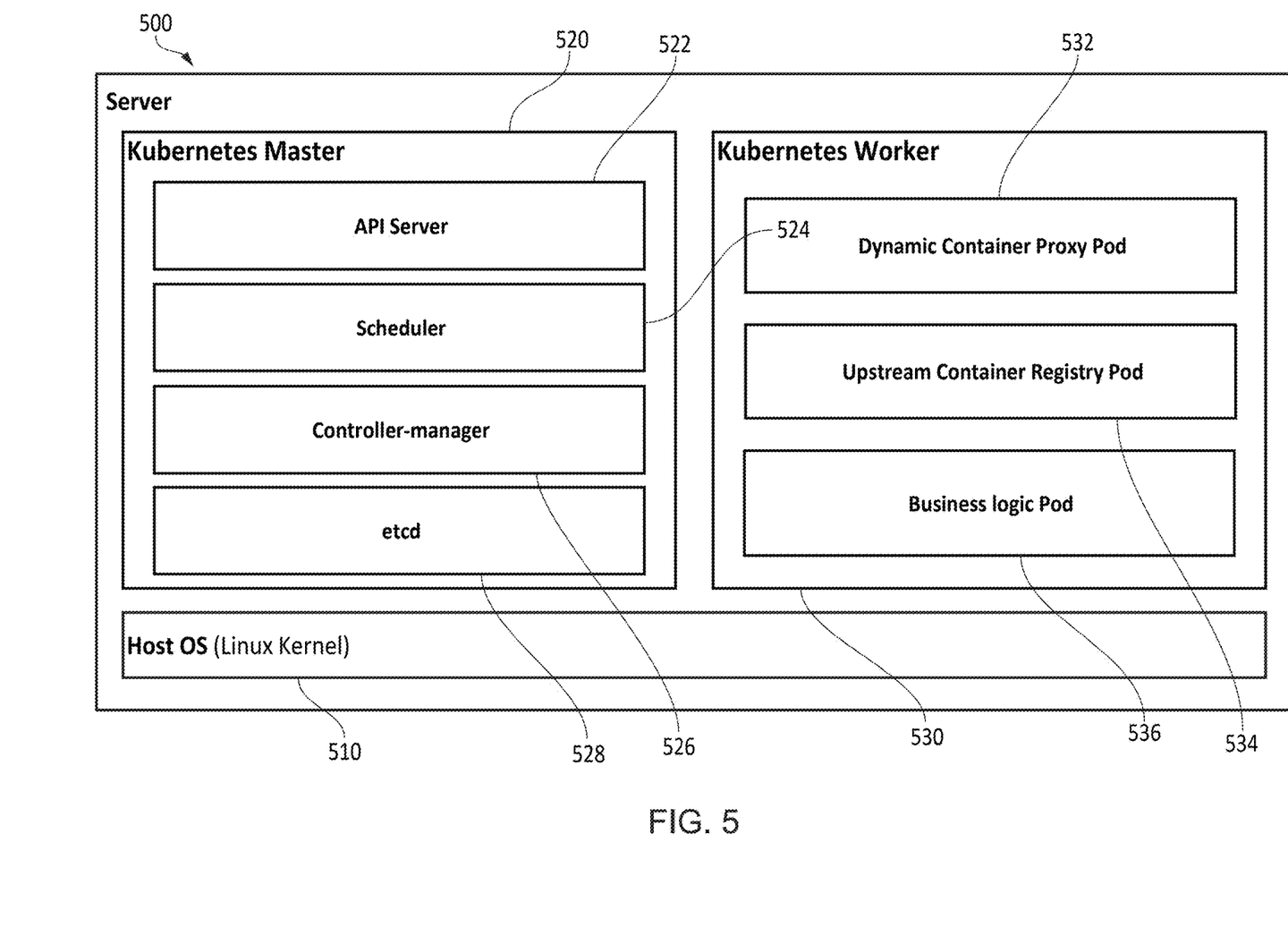
FIG. 5 illustrates software that executes on a server in communication with multiple self-service terminals.

FIG. 5 illustrates a server 500 running Kubernetes master and Kubernetes worker in isolation. The server may be in communication with multiple SSTs (not shown in FIG. 5). The server has one or more processors (not shown) and at least one memory (not shown). The memory stores executable software that is executed by the processors at runtime. The executable software includes a Linux kernel 510 (of a Host OS). It will be appreciated that in certain other embodiments of the present invention, other Operating Systems can be used. The executable software also includes a Kubernetes master 520. The Kubernetes includes similar components as described above with reference to FIG. 2. These are an API server 522, Scheduler 524, Controller-manager 526 and etcd database 528. A Kubernetes worker 530 also executes on the server. The Kubernetes worker 530 includes three pods which themselves include a software container element. A first pod on the server is a dynamic container proxy pod 532. This pod includes a corresponding dynamic container proxy software container. The dynamic proxy software container is responsible for receiving requests from a container engine for executable image files. A second pod on the server is an upstream container registry pod 534. This pod includes a corresponding upstream container registry software container. The registry container is responsible for storing image files and providing these image files to the container engine on request. A third pod on the server is a business logic pod 536. This pod includes a corresponding business logic software container.

Figure 6:
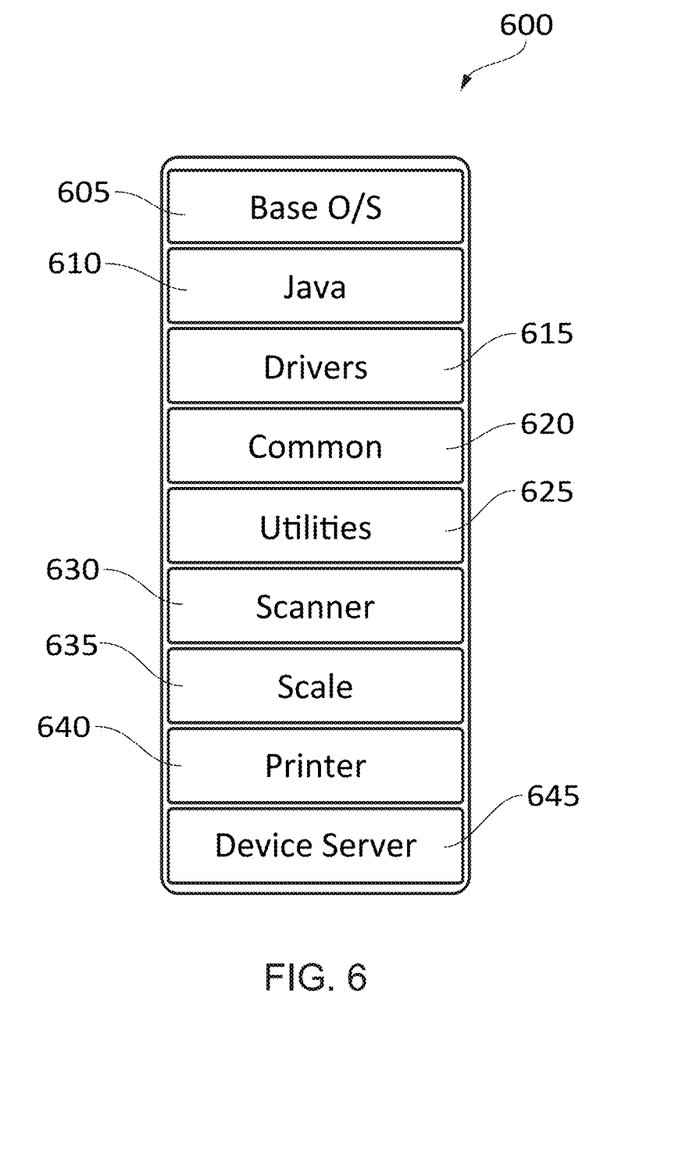
FIG. 6 illustrates the layers of an executable image file.

FIG. 6 illustrates a schematic representation of an executable image file 600 for execution as a software container. The image file shown in FIG. 6 is executable to provide the device server container of FIG. 4. As can be seen in FIG. 6, the executable image file has a Base Operating System layer 605, a Java layer 610, a Drivers layer 615, a Common layer 620, a Utilities layer 625, a Scanner layer 630, a Scale layer 635, a Printer layer 640 and a Device Server layer 645. This image file with these layers may be stored in the registry and downloaded on request from a container engine of a terminal. The Base OS layer defines the operating system that is to be utilized within the software container (e.g., Ubuntu). However, the Base OS layer may not be needed in certain other embodiments of the present invention. The Java layer defines executable instructions for interpreting a Java programming language. However, it will be appreciated that in certain other embodiments of the present invention, the Java layer may not be needed when other programming languages are used. The Drivers layer is an optional layer which defines executable instructions responsible for installing user-space drivers into the image. An example of a user-space driver might be a low-level USB helper. It will be appreciated that some images may not require any user-space drivers. The Common layer defines executable instructions containing framework components that are shared or used by other layers. An example of such a framework may be a logging framework that is used to control and capture logs from other components. The Utilities layer is an optional layer defining executable instructions including user facing utilities and tools. An example of such a tool may be a system maintenance utility that can be used to view the list of devices that are installed on the SST and interact with them with operations such as running a diagnostic check. Collectively the Drivers, Common and Utilities layers may be referred to as software dependencies. It will be appreciated that the driver layer and/or common layer and/or utilities layer may not be required in certain embodiments of the present invention. The Scanner layer defines executable instructions for communicating with a scanner peripheral device, the Scale layer defines executable instructions for communicating with a scale peripheral device and the printer layer defines executable instructions for communicating with a printer peripheral device. These layers may be referred to as peripheral device driver image layers. It will be appreciated that the layers for the scanner, scale and printer are layers associated with a specific scanner, scale or printer. As an example, the scanner may be an NCR 2356 Hand Held Scanner, the scale may be an NCR 8789 Scale, and the printer may be an NCR 7169 thermal receipt printer. It will also be appreciated that in certain other embodiments of the present invention, layers associated with other peripheral devices (barcode reader, cameras etc.) may be needed. It will also be appreciated that the peripheral device image layers shown in FIG. 6 may not always be needed. The device server layer defines the executable instructions for controlling, configuring or otherwise accessing one or more of the peripheral devices connected to the SST at a low level and exposing business level functions across the network to other components of the SST. For the INIT container the layers may be a Host OS layer (e.g., Ubuntu layer), a DKMS framework and build tools layer, a kernel driver source code layer and a driver detection, build and loading controller layer.

Figure 7:
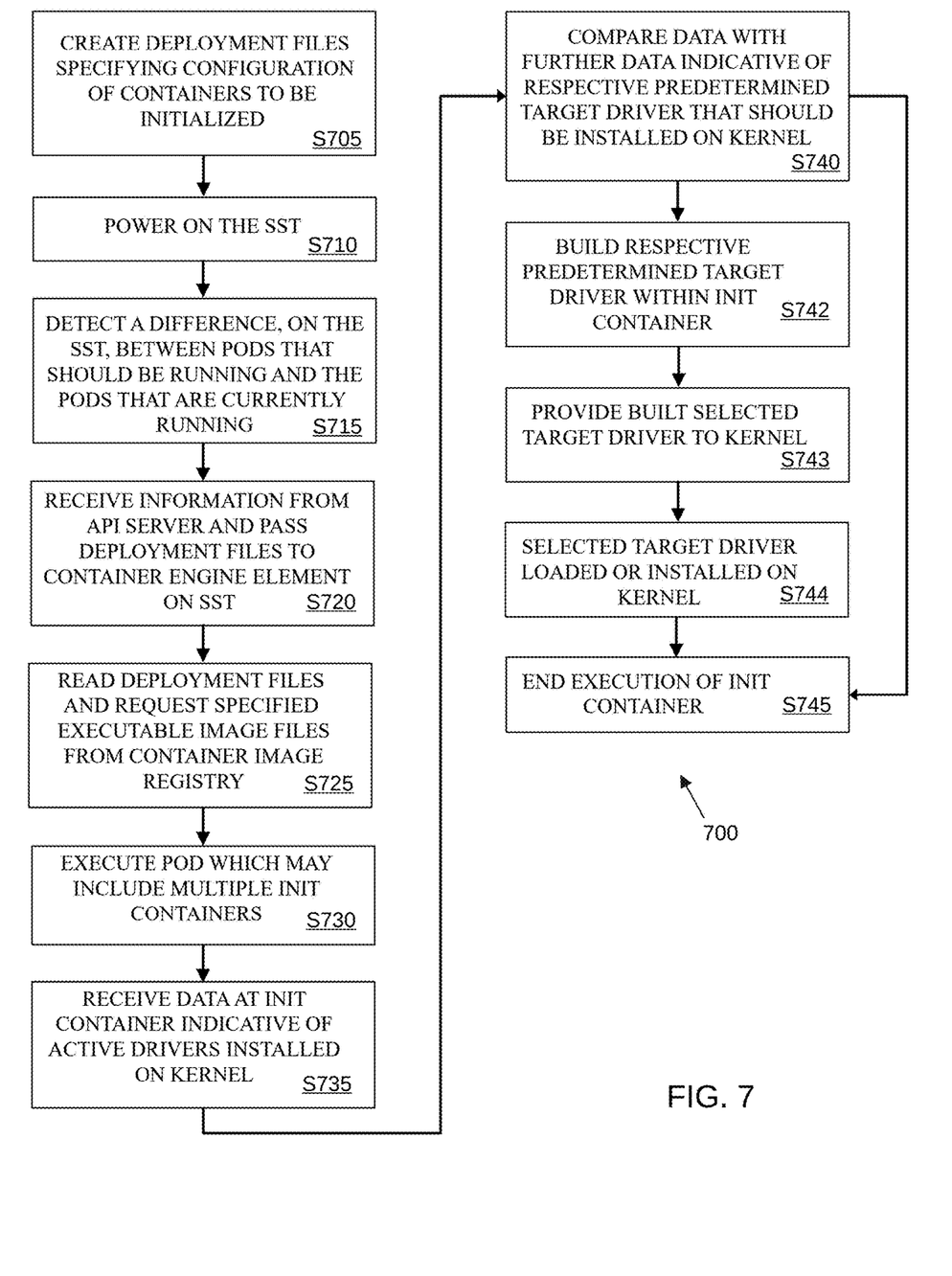
FIG. 7 illustrates a flow chart describing how a software container is provided that is configured to build kernel drivers according to the needs of a kernel.

FIG. 7 illustrates a block diagram 700 of certain steps that take place when a software container element that updates kernel drivers as required is initialized on a self-service terminal (SST). The SST may be any of the SSTs illustrated in FIGS. 1 to 6. When an SST is initially deployed, a first step S705 involves creating one or more deployment files specifying the configuration of instances of containers which should be initialized upon startup of the SST. The deployment file, amongst other things, specifies a name of an image file to be downloaded and executed to provide a software container. The deployment file also specifies what resources will be accessible by the container. Once the deployment file(s) is/are created, the deployment file(s) is/are uploaded to an API server of the Kubernetes master that is running on a server in communication with the SST. The Kubernetes master may be the same master as illustrated with respect to FIG. 2 or FIG. 5. The API server receives the deployment file(s) and stores the deployment file(s) in the etcd database of the Kubernetes master.

A next step S710 is powering on the SST. This may occur daily such as when a store is opened for business or if the terminal is restarted. The software on the SST, including the host OS and the Kubernetes worker configuration is then loaded from the memory of the SST and executed by the processors of the SST. The host OS includes a kernel. When a Kubernetes worker configuration is loaded, there will be no pods running initially. A next step S715 involves detecting, by a controller-manager of the Kubernetes master, a difference between the pods that should be running on the SST as specified in the deployment files stored on etcd and the pods that are currently running on the SST. The available resources on the Kubernetes worker will also be checked to determine that the resources required by a pod are available on the Kubernetes worker. Responsive to detecting that pods that should be executing on the SST are not, and that suitable resources are available, the API server of the Kubernetes master sends information to a kubelet on the SST to resolve this inconsistency. This information includes a deployment file for each pod that is to be executed on the SST. It will be appreciated that according to certain other embodiments of the present invention that do not make use of the Kubernetes orchestration platform, containers may be executed without the need for being run within pods (which are a particular feature of the Kubernetes system). A next step S720 involves receiving, by the kubelet, the information from the API server and passing deployment files to a container engine element on the SST.

Responsive to receiving the deployment files, a next step S725 involves reading, by the container engine, the deployment files and requesting executable image files specified in the deployment files from a container image registry. A next step S730 then involves executing, by the container engine, a pod which may include multiple INIT containers. Each of the INIT containers contains executable software. The executable software can be executed on a processor (or multiple processors) of the SST. The executable software in each INIT container defines the source code associated with a respective predetermined target driver of the predetermined target drivers as well as code defining how the respective predetermined target driver is built. In more detail, the executable software in each of the INIT containers defines the source code associated with a respective predetermined target driver, a framework for a Dynamic Kernel Make System (DKMS), a configuration for the DKMS and Linux build tools used by DKMS to build the respective predetermined target driver. It will be appreciated that in certain other embodiments of the present invention the build tools will be non-Linux based (i.e., when the kernel is not a Linux kernel). It will also be appreciated that in certain other embodiments of the present invention, instead of providing a separate INIT container for each and every predetermined target driver, one, two or three INIT containers may be provided. Each of these INIT container may for example contain executable software defining the source code associated with a set of predetermined target drivers, a framework for a Dynamic Kernel Make System (DKMS), a configuration for the DKMS and Linux build tools used by DKMS to build each target driver of the set of predetermined target drivers. If a single INIT container is provided, the executable software within this container may define source code associated with each of the predetermined target drivers, a framework for DKMS, a configuration for the DKMS and build tools usable by DKMS to build each of the predetermined target drivers.

Container image files for any INIT container needed on the SST can be made available in a container image registry. The container image files can be updated as and when needed to account for the latest kernel drivers that can be installed on a kernel of an SST. As discussed above, an INIT container runs prior to other containers within a pod and so is used to establish the environment for the other containers before they are executed. INIT containers then quit once they have completed their tasks. An INIT container is an example of a software container element. The executable software in the INIT container is responsible for building and loading kernel modules on the kernel of the SST host OS as described below.

Upon execution of each INIT container, a next step S735 involves receiving data at the INIT container that is indicative of the active drivers installed on the kernel. The data is for example indicative of the type and version of each of the active drivers. The data may be received in the form of files received from the OS associated with each of the active drivers. The se files may be referred to as driver information files. These files may be mounted into the INIT container. The files are received from the kernel of the SST that the kubernetes worker is running on.

Once the INIT container receives the data indicative of the active drivers installed on the kernel, a next step S740 involves comparing this data with further data that is indicative of the respective predetermined target driver that should be installed on the kernel. This further data may be specified within the INIT container. It will be appreciated that in certain other embodiments of the present invention where a single INIT container is provided (as discussed above), the further data may be indicative of each of the predetermined target drivers that should be installed on the kernel. To perform this comparison, the driver information files are queried to determine a type and version of each active driver installed on the kernel. Additionally, the executable software within the INIT container is also queried to determine a type and version of the respective predetermined target driver that should be installed. This comparison may be performed for each INIT container that is executed.

A step S745 of ending execution of an INIT container is initiated if it is determined that the respective predetermined target driver specified in the executable software of the INIT container is already installed on the kernel. In this case, it has been deduced that there is already an active driver on the kernel which is of the correct type and version as the respective predetermined target driver specified in the executable software of the INIT container. As a result, no action is required to build and install new drivers on the kernel of the host OS.

On the other hand, if it is determined that the respective predetermined target driver specified in the executable software of an INIT container is not installed on the kernel, a next step S742 of building the respective predetermined target driver within the INIT container follows. The predetermined target driver that is built may be referred to as a selected target driver. The selected target driver is built using the dynamic kernel make system (DKMS). As noted above, the kernel source code for the driver is included in the INIT container. Additionally, the relevant kernel header files for enabling the target drivers to be built correctly and compatibly with the currently running kernel are mounted read-only into the container from the kernel. These header files may have been mounted upon execution of the INIT software container. Thus, each INIT container may build a selected target driver when it determines that there is no corresponding active driver installed on the kernel (or it determines that the driver that is installed is out-of-date). It will be appreciated that in certain other embodiments of the present invention, a single INIT container may be provided that builds each of the necessary selected target drivers when it is determined that several active drivers are not installed on the kernel (or it is determined that the drivers that are installed are out-of-date). This may be achieved by including source code for each of the predetermined target drivers within a single INIT container. This has been discussed above.

For each INIT container that has determined the need to build a selected target driver, a next step S743 then involves providing the selected target driver that has been built to the kernel. This involves providing a predetermined communication pathway out of the INIT container to the kernel. When using Linux, this may be achieved by giving the container SYS_MODULE capability and then using the insmod command. However, it will be appreciated that other mechanisms may be used when employing other operating systems. Using this command does not require the INIT container to have privileged access to the kernel. The selected target driver is then loaded or installed on the kernel of the host OS whilst the host OS is running in a next step S744. This may be achieved by using the 'insmod' command mentioned above to load the drivers into the running kernel.

A step S745 of ending execution of the INIT container may be carried out following building of the selected target driver and provision of this driver to the kernel for installation. As discussed above, the steps described from S735-745 are carried out for each INIT container present on the SST.

A deployment file may be utilized by a Kubernetes master or a container engine running on an SST. The deployment file specifies the number and configuration of pods running a container or containers in a Kubernetes cluster. Each container in the pod is a runtime instance of the image defined in the deployment file.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

What is claimed is:

1. A computer-implemented method for determining if at least one predetermined target driver is to be installed on a kernel of a computing device, comprising steps of:
   providing an executable software within a single software container element as software that at least defines:
      source code associated with each predetermined target driver,
      a framework for a Dynamic Kernel Make System (DKMS),
      a configuration for the DKMS, and
      at least one build tool usable by the DKMS to build the predetermined target drivers;
   by the single software container element that contains the executable software executable on one or more processors of the computing device, receiving, from the kernel of the computing device, driver information files indicative of at least one active driver installed on the kernel;
   by the single software container element, comparing the driver information files with second data stored within the single software container element, wherein the second data is indicative of the at least one predetermined target driver that is to be installed on the kernel;
   responsive to the comparing and by the single software container element, determining if at least one of the predetermined target drivers is not installed on the kernel; and
   responsive to determining that there is at least one selected target driver, of the predetermined target drivers, not installed on the kernel, building at least one of the selected target drivers within the single software container element.

2. The method as claimed in claim 1, further comprising:
   the selected target drivers in the single software container element using the DKMS.

3. The method as claimed in claim 1, further comprising:
   providing the selected target drivers built within the single software container element to the kernel; and
   installing the selected target drivers built within the single software container element on the kernel.

4. The method as claimed in claim 1, further comprising:
providing the executable software within the single software container element as software that at least defines code defining how each of the predetermined target drivers is built.

5. The method as claimed in claim 1, further comprising:
providing respective executable software in each respective single software container element as software that at least defines source code associated with a respective predetermined target driver of the predetermined target drivers and code defining how the respective predetermined target driver is built.

6. The method as claimed in claim 1, further comprising:
receiving the driver information files as data indicative of each active driver installed on the kernel.

7. The method as claimed in claim 1, further comprising:
receiving the driver information files as data indicative of a driver type and driver version of the at least one active driver installed on the kernel.

8. The method as claimed in claim 1, further comprising:
receiving, at the single software container element, one or more kernel header files.

9. The method as claimed in claim 8, further comprising:
mounting the kernel header files read-only into the single software container element.

10. The method as claimed in claim 1, wherein:
the comparing the driver information files with the second data comprises querying one or more files received from the kernel to determine a type and version of each active driver installed on the kernel.

11. The method as claimed in claim 10, wherein:
the comparing the driver information files with the second data further comprises querying the executable software to determine a type and version of said at least one predetermined target driver.

12. The method as claimed in claim 1, further comprising:
responsive to the comparing, determining at least one selected target driver, of the predetermined target drivers, that has an out-of-date version installed on the kernel.

13. The method as claimed in claim 1, further comprising:
providing the single software container element as a software container element of an INIT type.

14. The method as claimed in claim 1, further comprising:
providing the executable software as software that is executable independent of computing environment.

15. The method as claimed in claim 1, further comprising:
via the single software container element, executing the executable software in an isolated computing environment.

16. A computing device comprising one or more processors configured to execute executable software contained within a single software container element, the executable software defining source code associated with each predetermined target driver, a framework for a Dynamic Kernel Make System (DKMS), a configuration for the DKMS, and at least one build tool usable by the DKMS to build the predetermined target drivers,
wherein the executable software, when executed, is configured to:
receive, from a kernel of the computing device, driver information files indicative of at least one active driver installed on the kernel;
compare the driver information files with second data stored within the single software container element, wherein the second data is indicative of at least one predetermined target driver that is to be installed on the kernel;
determine whether at least one of the predetermined target drivers is not installed on the kernel; and
responsive to determining that at least one selected target driver of the predetermined target drivers is not installed on the kernel, build at least one of the selected target drivers within the single software container element.

17. The computing device as claimed in claim 16, wherein the computing device is a point of sale terminal or a self-service terminal.

* * * * *